UNITED STATES PATENT OFFICE.

JOSEPH N. BOURG, OF HIGHLAND PARK, MICHIGAN, ASSIGNOR TO PARK CHEMICAL COMPANY, OF DETROIT, MICHIGAN, A CORPORATION OF MICHIGAN.

COMPOUND FOR CARBURIZING METAL AND PROCESS OF FORMING THE SAME.

1,358,281. Specification of Letters Patent. Patented Nov. 9, 1920.

No Drawing. Application filed September 4, 1917. Serial No. 189,622.

*To all whom it may concern:*

Be it known that I, JOSEPH N. BOURG, a citizen of the United States of America, residing at Highland Park, in the county of Wayne and State of Michigan, have invented certain new and useful Improvements in Compounds for Carburizing Metals and Processes of Forming the Same, of which the following is a specification, reference being had therein to the accompanying drawings.

This invention relates to materials for case-hardening or the like, and also particularly refers to the method of manufacturing such materials.

Among the objects of the invention are to provide a material and method of making the same whereby the energizing agent or agents can be mixed with a carbonaceous material in such a manner that the energizing agent will not separate out to any material extent when handled, such as in shipping; to provide a compound and method of making the same whereby the necessity of using asphaltum or like tacky binders is avoided; and in general to provide an improved material of the character above referred to and process of making such material.

Describing in detail one compound which embodies my invention and the material and process of making the same is as follows:

Small pieces or granules of charcoal, coke, charred leather or the like of about corn size are heated in a furnace or other suitable device to a red heat. The material is then withdrawn and sprayed with a water solution of the energizing agent, the carbonaceous material being at the same time thoroughly mixed so that all parts of the carbonaceous material will be treated with the solution of the energizing agent.

While various energizing agents may be employed and the proportions varied without departing from the scope of my invention, I have found that an effective material for case-hardening or the like can be produced where eighty pounds of the carbonaceous material are treated with a water solution of eight pounds of barium carbonate, six pounds of calcium carbonate and six pounds of sodium carbonate, these carbonates being dissolved or held in suspension in about five gallons of water.

It is to be noted that the sodium carbonate being soluble in water will be held in solution, while the barium carbonate and calcium carbonate are merely held in suspension. The water of the mixture during the spraying and mixing process is converted into steam and passes off from the mixture, leaving a dry and uniform carbonaceous material to which the energizing agents have been supplied. The volume of water to be used is to some extent dependent upon the temperature of the carbonaceous material, that is, there should be sufficient water to carry in suspension or solution the necessary percentage of energizing agent, while at the same time it is desirable that only such quantity of water be applied as will be entirely evaporated by the heating of charcoal or other material.

A compound produced by the above process has the energizing agent so affixed to the relative inactive carbonaceous material as to prevent any material separation of the energizing agent from the granules of the charcoal, coke, etc. This avoids the necessity of using a binding material or fusing the energizing agent into the carbonaceous material, which latter is objectionable, in that, it often changes materially the composition of the energizing agents. A further advantage is derived, in that, where charcoal or other shrinkable material is employed, the harmful shrinkage when the material is employed in the case-hardening operation is materially reduced.

While I have described the use of certain materials and in certain proportions, I do not wish to limit my invention to such mixtures nor to the particular substances and proportions named.

What I claim as my invention is:—

1. The process of producing material for case-hardening or the like which comprises subjecting carbonaceous material to heat and spraying such material with a mixture containing energizing agents while the carbonaceous material is in its heated condition.

2. The process of producing material for case-hardening or the like which comprises subjecting carbonaceous material to heat and spraying such material with a liquid mixture containing energizing agents while the carbonaceous material is subjected to a substantially red heat.

3. The process of producing material for case-hardening or the like which comprises subjecting carbonaceous material to heat and spraying such material with a water mixture containing energizing agents while the carbonaceous material is in its heated condition and mixing said material while it is subjected to the spraying action.

4. The process of producing material for case-hardening or the like which comprises heating small particles of carbonaceous material, mixing energizing agents with water in such proportion that the water will be evaporated when the carbonaceous material is sprayed with the water mixture, and applying the water mixture to the carbonaceous material when the latter is in its heated condition.

5. The process of producing material for case-hardening or the like which comprises subjecting substantially corn-size particles of carbonaceous material to high heat and while heated mixing it with a liquid containing energizing agents.

6. The process of producing material for case-hardening or the like which comprises subjecting substantially corn-size particles of carbonaceous material to high heat and while heated mixing it with a liquid containing energizing agents, and agitating the material so that all parts are subjected to the treatment of the energizing material.

7. In the process of producing material for case-hardening or the like, the subjecting of approximately eight pounds of carbonaceous material to heat and the spraying of such material with a mixture formed of approximately eight pounds of barium carbonate, approximately six pounds of calcium carbonate and approximately six pounds of sodium carbonate in approximately five gallons of water while the carbonaceous material is in heated condition.

8. In the process of producing material for case-hardening or the like, the subjecting of carbonaceous material to heat and the spraying of such material with water containing sodium carbonate in solution and calcium and barium carbonates in suspension while such material is heated.

In testimony whereof I affix my signature.

JOSEPH N. BOURG.